INVENTORS
CHARLES A. BORCHER
WILLIAM FRANTZ
ATTORNEY

INVENTORS
CHARLES A. BORCHER
WILLIAM FRANTZ
BY
ATTORNEY

INVENTORS
CHARLES A. BORCHER
WILLIAM FRANTZ

ATTORNEY

United States Patent Office 3,221,562
Patented Dec. 7, 1965

3,221,562
FLUID PRESSURE OPERATED ACCELEROMETER HAVING SIGNAL OUTPUT CORRESPONDING TO RATE AND DIRECTION OF ACCELERATION
Charles A. Borcher, Orange County, and William Frantz, Seminole County, Fla., assignors to Martin-Marietta Corporation, Middle River, Md., a corporation of Maryland
Filed Feb. 27, 1963, Ser. No. 261,335
18 Claims. (Cl. 73—515)

This invention relates to acceleration responsive devices, and more particularly to fluid pressure operated accelerometer means capable of producing a fluid pressure signal corresponding to both the rate and the direction of acceleration which the device experiences.

Prior art accelerometers have been proposed heretofore which comprise support means and a mass supported thereby for relative movement therebetween so that when the support means is moved with respect to an external frame of reference by accelerating forces, the inertial tendency of the mass to remain stationary with respect to the frame of reference results in displacement of the mass from a normal resting position with respect to the support means. Such devices have included electrical and pneumatic means for generating a restoring or balancing force in response to the degree of displacement of the mass, the restoring force being taken as a measure of the acceleration. The electrical systems have utilized electromagnetic displacement detecting and force producing means which have been subject to false signals generated by random disturbances or self induced signals, and have required high gain amplifier means associated with the electrical systems. The pneumatic systems have been limited to the production of a fluid pressure signal which is indicative only of the rate of acceleration, and have been ambiguous as to the direction thereof.

Yet another shortcoming of prior accelerometer devices has been a notable lack of uniform sensitivity throughout the range thereof, the devices being progressively less sensitive to acceleration changes as the acceleration approaches zero.

Accordingly, it is a principal object of this invention to provide an improved acceleration responsive device which employs an inertial mass which tends to remain stationary or at a constant velocity with respect to an external frame of reference upon acceleration of a supporting means, the resulting displacement of which with respect to the support means produces fluid pressure signals which are indicative of both the direction and the magnitude of acceleration.

It is another object of this invention to provide an improved bidirectional accelerometer device of the foregoing character comprising a fluid pressure system which produces first and second forces acting on the mass in opposite directions and which provide a net force corresponding to displacement of the mass and acting to balance the displacement forces of acceleration. Net forces balancing positive acceleration forces are indicated by fluid pressure signals within a first range of values, and net forces balancing negative acceleration forces are indicated by fluid pressure signals within a second range of values, whereby both the direction and the rate or magnitude of acceleration may be determined simultaneously from the pressure signals.

As another object this invention aims to provide an improved fluid pressure operated accelerometer apparatus which provides fluid pressure signals indicating both direction and rate of acceleration, and which signals are in the form of positive pressures in either pneumatic or hydraulic fluid and are capable of performing useful work in the operation of indicators, control devices, and the like, without impairing the accuracy of the apparatus.

Still another object of this invention is the provision of a bidirectional pneumatic accelerometer which exhibits substantially uniform sensitivity throughout its range of operation, particularly when passing through zero acceleration from either positive or negative acceleration values.

Our invention achieves these and other objects through the provision of an accelerometer device forming part of a live, flowing pressure system and comprising an inertial member such as a pendulous mass mounted in support means for movement with respect thereto in opposite directions as a result of acceleration of the device, the device including fluid conducting means for connection to a source of pressure fluid at a regulated or constant pressure and comprising first and second orifices connected in series so that fluid flow therethrough will establish between the orifices a resulting signal pressure related to the ratio of areas of the orifices. The accelerometer further comprises a first pressure to force converting means, such as an expansible bellows or diaphragm, responsive to the constant supply pressure and acting to urge the inertial mass in one direction, and a second pressure to force means responsive to the signal pressure between the orifices and acting to urge the inertial means in the opposite direction, the second pressure to force means having an effective area or pressure to force conversion factor greater than that of the first pressure to force means, and means operable by movement of the inertial mass to vary one of the orifices and said signal pressure so that the net effect of said first and second pressure to force means acts to balance acceleration forces tending to cause movement of the inertial mass. Because the signal pressure increases from a predetermined value with increases in acceleration in one direction, and decreases from that value with increases in acceleration in the opposite direction, the signal pressure may be taken as a simultaneous indication of direction and magnitude of acceleration.

The invention may further be said to reside in certain novel combinations and arrangements of parts hereinafter described and particularly set out in the claims hereof.

In the accompanying sheets of drawings forming a part of this specification:

Figure 1:
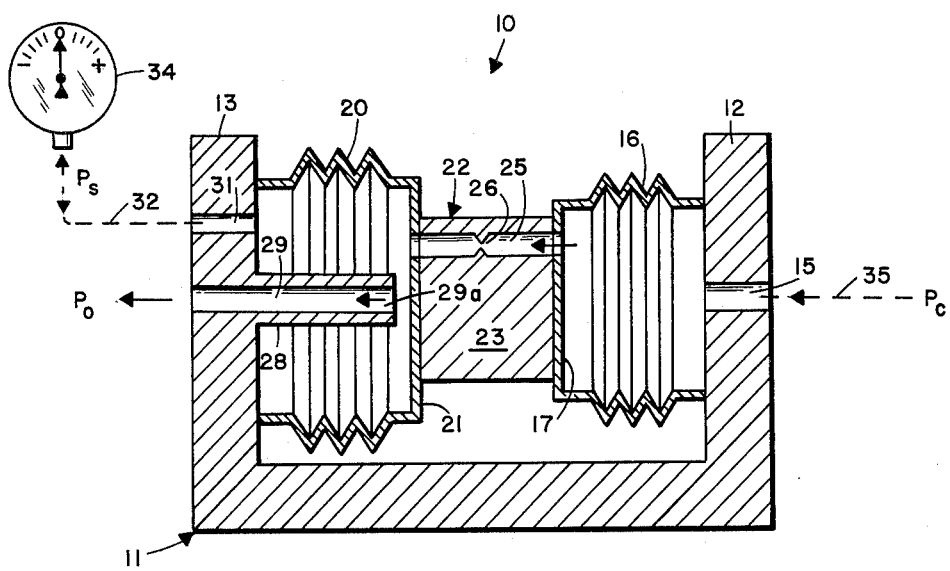
FIG. 1 is a diagrammatic illustration of an accelerometer device embodying this invention.

In the form of the invention shown in FIG. 1, there is provided an acceleration responsive device or accelerometer 10 forming part of a bidirectional acceleration indicating system. The accelerometer 10 comprises support means in the form of a U-shaped frame 11 having spaced, parallel uprights 12 and 13. The upright 12 is provided with an inlet passage 15 communicating with the interior of a first pressure to force converting means in the form of an expansible bellows 16 mounted on the upright 12 and including a movable wall 17. A second pressure to force converting means in the form of a bellows 20, which has in this exemplary embodiment an effective area twice that of bellows 16 for a purpose which will become apparent as the description proceeds, is mounted on upright 13 and includes a movable wall 21. Disposed between the bellows 16 and 20 is a movable inertial mass 22 in the form of a weight member 23 secured to the movable bellows walls 17 and 21. The weight member 23 is provided with a passageway 25 leading from the interior of bellows 16 to the interior of bellows 20, and comprises a fixed orifice 26.

The upright 13 is provided with a tubular extension 28 extending into the bellows 20 and terminating adjacent the inner surface of the movable wall 21. An outlet or drain passage 29 is defined in the extension 28 and upright 13, the passage 29 having its outer end opening to the atmosphere and its inner end opening at 29a adjacent the movable wall 21 of bellows 20. It will be recognized that the effective area of the opening at the end 29a of the passage 29 will be governed by the position of the mass 22 and movable wall 21 with respect to the extension 28. The opening between the passage end 29a and wall 21 will therefore be hereafter referred to as the variable orifice 29a. The upright 13 is provided with a second passageway 31 which is adapted to be connected by a line 32 to a pressure indicating gauge 34.

The passageway 15 is connected by a pressure supply line 35 to a pressure fluid supply which provides pressure fluid at a constant supply pressure $P_c$. The supply pressure $P_c$ is maintained constant with respect to the ambient pressure about the device 10 or to a reference pressure, the ambient or reference pressure being referred to as $P_o$. The regulation of $P_c$ with respect to $P_o$ is achieved by any well known means which forms no part of the present invention and so need not be further described.

It will be seen that pressure fluid flow may be traced from the pressure supply line 35 through passage 15 into bellows 16, thence through fixed orifice 26 to the interior of bellows 20, and through the variable orifice 29a and passage 29 to the ambient atmosphere at pressure $P_o$. The just described flow path will be seen to comprise a fixed orifice 26 and a variable orifice 29a connected in series with the bellows 20 therebetween. Assuming the pressure differential between $P_c$ and $P_o$ to remain a constant K, there will be developed between the orifices and within the bellows 20 a resultant or signal pressure $P_s$ which will vary inversely with respect to changes in the variable orifice 29a. That is to say, if the mass 22 and wall 21 are moved away from the tubular extension 28, so as to increase the effective area of the variable orifice 29a, there will be experienced a corresponding reduction in the pressure $P_s$ in the bellows 20. Conversely, when the mass 22 is moved toward the variable orifice 29a so as to reduce the effective area thereof, there will be experienced in the bellows 20 a corresponding increase in the pressure $P_s$. Thus, $P_s$, the pressure between the orifices and acting within bellows 20, is dependent upon the ratio of the sizes of the orifices 26 and 29a, and the volume of fluid therebetween may be changed, as by doing an increment of work, without changing $P_s$.

Because the bellows 16 is always subjected to a constant internal pressure $P_c$ with respect to the external pressure $P_o$, the bellows 16 will exert a constant force $F_c$ on the mass 22 urging it to the left as viewed in the drawings. This force $F_c$ may be represented by the equation $F_c = (P_c - P_o) A_1$, where $A_1$ is the effective area of the small bellows 16, or $$F_c = P_c A_1 \qquad \text{Equation I}$$

when $P_o$ is negligible.

The bellows 20 will exert a variable force $F_v$ urging the mass 22 to the right. Since the bellows 20 is responsive to the resulting signal pressure $P_s$ and has an area twice that of bellows 16, then $$F_v = P_s(2A_1) \qquad \text{Equation II}$$

The bellows 16 and 20 act in opposition on the mass 22 and tend to move it to a position in which the forces thereon are in balance. Assuming the device 10 to be at constant or zero velocity with respect to an external frame of reference, the only forces acting on the mass 22 tending to displace it to the left or the right will be the forces $F_c$ and $F_v$. Now, if $F_v$ is either less than or greater than $F_c$, the mass 22 will be displaced slightly to the left or right respectively, and will cause the effective area of the variable orifice 29a to be reduced or enlarged, thereby increasing or decreasingg $F_v$ until $F_v = F_c$ and the mass 22 is in a balanced condition. When the mass 22 is so balanced with the device at zero or constant velocity, then $$P_c(A_1) = P_s(2A_1) \text{ or } P_s = \frac{P_c}{2}$$

Equation III

The range of movement of the mass 22 and the wall 21 to achieve a balance situation within the scope of operation of the device is on the order of only several thousandths of an inch. Accordingly, the introduction of errors from progressive distention of the bellows, and the like, are substantially eliminated.

The indicator or pressure gauge 34, which is connected by pressure line 32 and the passage 31 to the interior of bellows 20, is subjected to the signal pressure $P_s$. The indicator 34 is, in this example, a simple Bourdon type pressure gauge having a full scale deflection equal to $P_c$ and so, when the mass 22 is in the above described balanced condition at zero acceleration of the device 10, the indicator will be deflected to a half scale position. The scale of indicator 34 is calibrated in terms of positive and negative acceleration on opposite sides of the half scale deflection corresponding to zero acceleration at which $$P_s = \frac{P_c}{2}$$

The direction and magnitude of acceleration of the device 10 to the left or right as viewed in the drawings may then be read directly from the indicator in a manner which will become apparent as the description proceeds.

Thus, if the device 10 is accelerated to the right, the inertial force of acceleration $F_a$ tending to displace the mass 22 to the left with respect to frame 11 may be expressed in accordance with Newton's laws of motion as $$F_a = M(a) \text{ or } F_a = \frac{W(a)}{g} \qquad \text{Equation IV}$$

where W is the effective weight of member 23 and portions of bellows 16 and 20, $g$ is the gravitational constant, and $(a)$ is the acceleration. The combined effects of $F_c$ and $F_a$ will displace the mass 22 to the left thereby decreasing the effective area $A_v$ of the variable orifice 29a and increasing $P_s$ and $F_v$ until the latter balances $F_c + F_a$. The increase in $P_s$ will cause the indicator 34 to register positive acceleration, that is acceleration to the right, by deflecting the needle of the indicator to a corresponding reading to the right of the mentioned center or zero reading.

That the signal pressure may be taken as a direct indication of the direction and magnitude of acceleration will be seen from a consideration of the following: When the accelerometer is in balance and under acceleration, $F_v = F_c + F_a$ or, by substitution from Equations I, II and IV, $$P_s(2A_1) = P_c(A_1) + \frac{W(a)}{g}$$

Then $$P_s = \frac{P_c + \frac{W(a)}{gA_1}}{2}$$

Equation V

Thus, when the acceleration is zero, Equation V simplifies to $$P_s = \frac{P_c}{2}$$

which will be recognized as Equation III above, and $P_s$ will effect a half scale deflection of indicator 34 thereby indicating zero acceleration. If the acceleration ($a$) has a positive value, $P_s$ will be greater than $P_c/2$ by an amount equal to $W(a)/gA_1$, and a corresponding positive deflection will be observed at indicator 34. Conversely, if the acceleration ($a$) has a negative value, $P_s$ will be less than $P_c/2$ by an amount equal to $W(a)/gA_1$, as will be indicated by a corresponding negative deflection at indicator 34.

Figure 7:
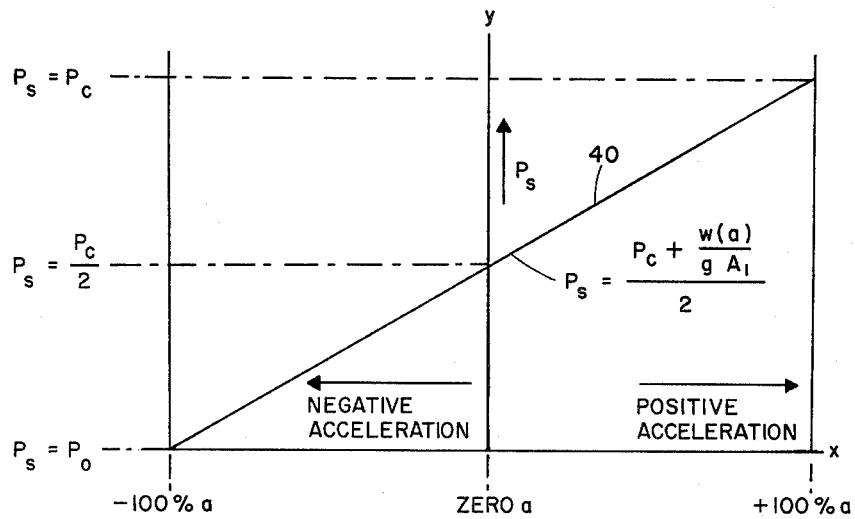
FIG. 7 is a graphic illustration of the pressure signal output of accelerometers embodying the invention.

The relationship between the signal pressure $P_s$ and acceleration (both positive and negative) may be graphically seen by reference to FIG. 7 which constitutes a curve 40 corresponding to Equation V in which the Y axis represents the signal pressure $P_s$ and the X axis represents acceleration of the device 10. Abscissas to the right of the Y axis correspond to positive acceleration, while those to the left correspond to negative acceleration.

As the accelerometer device 10 passes from maximum acceleration in one direction through a condition of zero acceleration and on to maximum acceleration in the opposite direction, there is no change in phase or direction of movement of parts or operating media, nor is there any material relaxing of forces acting on the mass 22. Accordingly, the response or sensitivity of the accelerometer device is uniform throughout its operational range.

Although the above described form of the accelerometer device utilizes a signal pressure responsive pressure to force converting bellows 20 which is twice the size of the constant pressure bellows 16 so that a signal pressure $P_s$ is developed having equal ranges above and below the signal pressure corresponding to zero acceleration, it will be understood that other ratios may be used. For example the bellows 20 could have three times the effective area of bellows 16, in which case the device would have an extended range of indication for positive acceleration and a reduced range of indication of negative acceleration. Other ratios may be desirable to suit other circumstances in which the accelerometer is used. For example, the device may be oriented for use in indicating vertical acceleration by rotating it 90° from its illustrated position to bring the bellows 16 below bellows 20, and the effective area of bellows 16 increased by an amount $\Delta A_1$ such that $P_c(\Delta A_1)$ will equal the effective weight of the member 23 and its associated movable parts. By so doing, at zero acceleration the device will be in balance and the indicator 34 will give a zero indication at half scale so that either upward or downward acceleration may be read from the indicator simultaneously with the magnitude of acceleration. Thus, it will be appreciated that the device may be adapted to orientation in any desired position with respect to an external frame of reference and to indicate, bidirectionally, acceleration of the device when so oriented.

Figure 2:
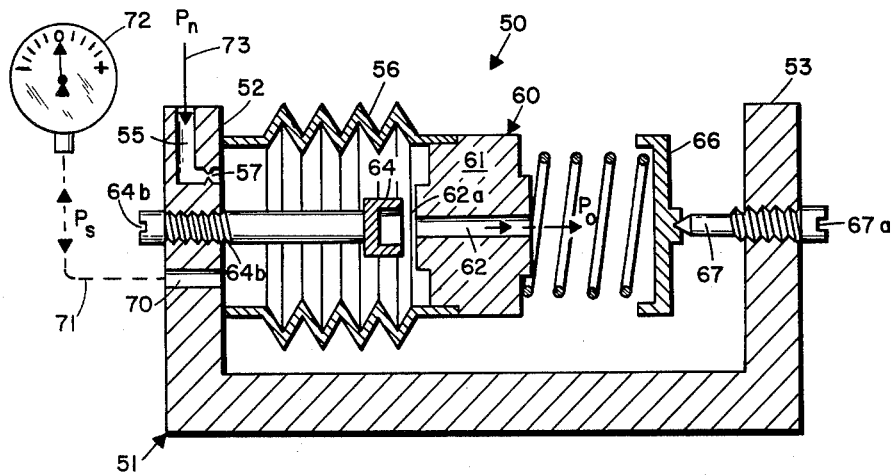
FIG. 2 is a diagrammatic illustration of another embodiment of the invention.

Referring now to FIG. 2 of the drawings, there is illustrated therein another embodiment of the invention which, because of its adjustability and substitution of a spring for the constant pressure bellows, is somewhat more versatile than the foregoing embodiment. Also, as will become evident, the embodiment now to be described does not require a pressure regulated supply of pressure fluid.

The accelerometer device 50 comprises a U-shaped support means or frame 51 having spaced parallel upright portions 52 and 53. The upright 52 is provided with an inlet passage 55 which communicates with the interior of an expansible bellows 56 through a fixed orifice 57. The bellows 56, which is mounted on the upright 52, is secured at its movable end to an inertial mass 60 in the form of a weight 61. The weight 61 is provided with an axially extending drain or outlet passage 62 communicating between the interior of bellows 56 and the ambient atmosphere. The weight member 61 is normally urged to the left toward a stationary valve 64 by a compression spring 65 disposed between the weight member 61 and a spring end cup 66. The spring end cup 66 is conveniently universally mounted on the conical point of a bearing member 67 having a shaft portion which is threadedly engaged in an opening in upright 53. The bearing member 67 is provided with a screw driver slot 67a and may be threadedly advanced or retracted with respect to upright 53 to adjust the force exerted by spring 65 against weight member 61.

The stationary valve 64 is provided with a threaded stem 64a extending through a threaded opening in upright member 52, and is provided with a screw driver slot 64b for convenient adjustment of the position of the valve 64 with respect to the weight member 61. The stationary valve 64 cooperates with the adjacent surface of weight member 61 surrounding passage 62 and it will be recognized that the opening of the passage 62 will be governed by movement of the weight member 61 toward or away from the valve 64 and this opening will be referred to as variable orifice 62a.

The upright member 52 is further provided with a signal pressure passage 70 which is connected by a line 71 to a pressure gauge 72 which is similar to the gauge 34 already described.

The inlet passage 55 is connected by a line 73 to a source of pressure fluid which may be non-regulated in its pressure $P_n$, so long as $P_n$ at least equals the maximum scale deflection desired at gauge 72. A fluid flow path may be traced from inlet passage 55 through fixed orifice 57, bellows 56, variable orifice 62a and outlet passage 62 to the atmosphere at pressure $P_o$. It will be recognized that the just described flow path comprises a fixed orifice and a variable orifice connected in series with the bellows 56 therebetween and that the pressure $P_s$ generated within the bellows 56 and registered by gauge 72 will increase upon movement of weight member 61 toward the stationary valve 64 to restrict variable orifice 62a, and conversely will decrease upon movement of the weight member 61 away from the stationary valve to increase the variable orifice 62a. The weight 61 seeks a balance position in which the product of the signal pressure $P_s$ within the bellows 56 and the effective area A of the bellows equals the force of the spring 65 which is a substantially constant force $F_c$. The length of the spring 65 may be adjusted through the agency of the bearing member 67 until $P_s$ provides a desired indication at the gauge 72, for example half-scale when the device is at zero acceleration. Therefore, acceleration ($a$) of the device 50 to the right as viewed in the drawings will result in an additional force $F_a$ on the mass 60 moving it to the left and reducing variable orifice 62a thereby increasing $P_s$ until the product of $P_s$ times A equals $F_c+F_a$, and a corresponding registration of positive acceleration appears at gauge 72. Conversely, acceleration of the device 50 to the left will result in an increase in variable orifice 62a and a corresponding registration of negative acceleration at the gauge 72. Since the zero acceleration value of pressure $P_s$ in the bellows 56 is dependent only upon the force $F_c$ of the spring 65 and is independent of the supply pressure $P_n$, the accelerometer device 50 does not require a regulated supply and may be said to act as its own regulator.

Because the movement of the mass 60 with respect to the stationary valve 64 within the range of operation of the device is on the order of only several thousandths of an inch, a distance which is small as compared to the length of spring 65, the accelerometer device 50 will provide substantially the same accuracy and sensitivity throughout its range of operation as the above described accelerometer device 10. Additionally, the length and force of spring 65 may be conveniently adjusted to select zero acceleration values of $P_s$ which provide the desired ranges of positive and negative acceleration. The range of either positive or negative acceleration may thereby be extended as necessary to suit the circumstances or attitudes in which the device is used.

Yet another embodiment of the invention is illustrated in FIGS. 3–6, wherein an acceleration responsive device 80 comprises a frame 81 including a base plate 82 on which are mounted a pair of uprights 83 and 84. The upright 83 is secured to the base plate 82 as by screws 85 while the upright 84 has a foot portion 84a which cooperates with a track 86 on the base plate for adjustability thereof toward or away from upright 83, the upright 84 being clamped in its adjusted position by screws 87 extending through elongated notches in the foot portion.

The uprights are joined by a cross member 88 extending parallel to the base plate 82 and having an opening 88a therein. The cross member 88 is conveniently secured to the upper ends of the uprights as by screws 89 cooperating with slots in the cross member to permit adjustable positioning thereof. Supported within the frame 81 is a pendulous inertial mass 90 which comprises a first cylindrical member 91 having an internally threaded axial bore receiving a threaded stud 92 of a second cylindrical member 93.

The stud 92 extends through aligned openings in a pair of rigid channel members 94 and 95 which are arranged in back to back relation with a flexible strip 96 disposed between the web portions 94a and 95a thereof. One end, 96a of the flexible strip 96 extends beyond the rigid channel members 94 and 95 into the opening 88a of cross member 88. This end 96a of the flexible strip is secured to the cross member 88 by means of a clamping bar 98 and suitable screws 99 as shown. The flexible strip 96 provides a substantially friction free pivot means for the inertial mass 90 and, because the width of the strip and short exposed portion thereof resists torsion, the mass 90 is constrained to pendulous motion in opposite direction in a single plane.

The mass 90 is confined between expansible power elements or pressure to force converting means in the form of a large bellows 102 mounted on upright 83, and small bellows 103 mounted on upright 84. The large bellows 102, which is suitably mounted by means of screws 104 and is provided with a seal 105, includes a movable diaphragm portion 106 having an embossed post 107 engaging the member 93 of the mass 90. Similarly, the bellows 103, which is suitably secured by means of screws 108 and is provided with a seal 109, includes a movable diaphragm portion 110 having an embossed post 111 bearing against the member 91 of inertial mass 90. As in the accelerometer device 10, the larger bellows 102 has an effective area which is twice that of the smaller bellows 103.

Figure 4:
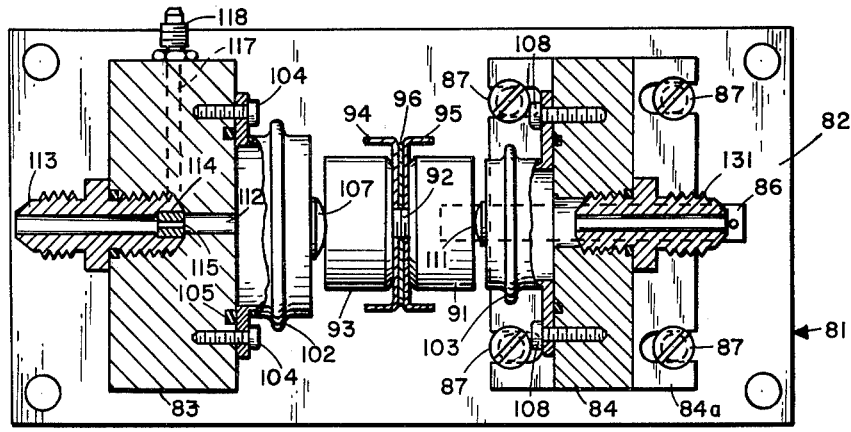
FIG. 4 is a horizontal section taken substantially along line 4—4 of FIG. 3.
Figure 5:
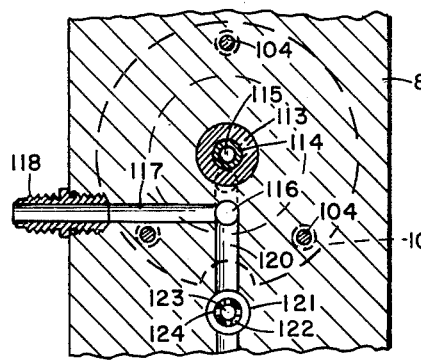
FIG. 5 is a fragmentary sectional view taken along lines 5—5 of FIG. 3.

The upright 83 is provided with a passage 112 which opens at one end into the interior of bellows 102 and threadedly receives at the other end a nipple or connector 113. The connector 113 is provided with a passage restrictor 114 defining a small fixed orifice 115. The interior of bellows 102 communicates through passages 116 and 117 in upright 83, with another nipple or connector 118 (FIGS. 4 and 5). An additional passage 120 leads from the junction of passages 116 and 117 to a stepped through bore 121 in the upright 83.

The bore 121 slideably receives an elongated, externally threaded tubular member 122 having an axial passage 123. The passage 123 communicates with passage 120 through radial ports 124 opening into an annular groove disposed in registration with the passage 120 and lying between sealing rings 125 and 126. The tubular member 122 has its outer end plugged as at 122a and has its inner end disposed in closely spaced relation to the web portion 94a of the channel member 94, with the passage 123 terminating in an orifice 127 facing the web 94a. The tubular member 122 may be adjustably positioned with respect to the upright 83 to vary the spacing between the inner end and the web 94a and is secured by nuts 128 and 129 acting against the faces of the upright.

It will be recognized that movement of the mass 90 and the supporting channel members 94, 95 with respect to the frame 81 will result in variable restriction of the orifice 127 by the web 94a.

The upright 84 is provided with a passage 130 which opens at one end into the interior of the small bellows 103, and threadedly receives a nipple or connector 131 at the other end.

Figure 6:
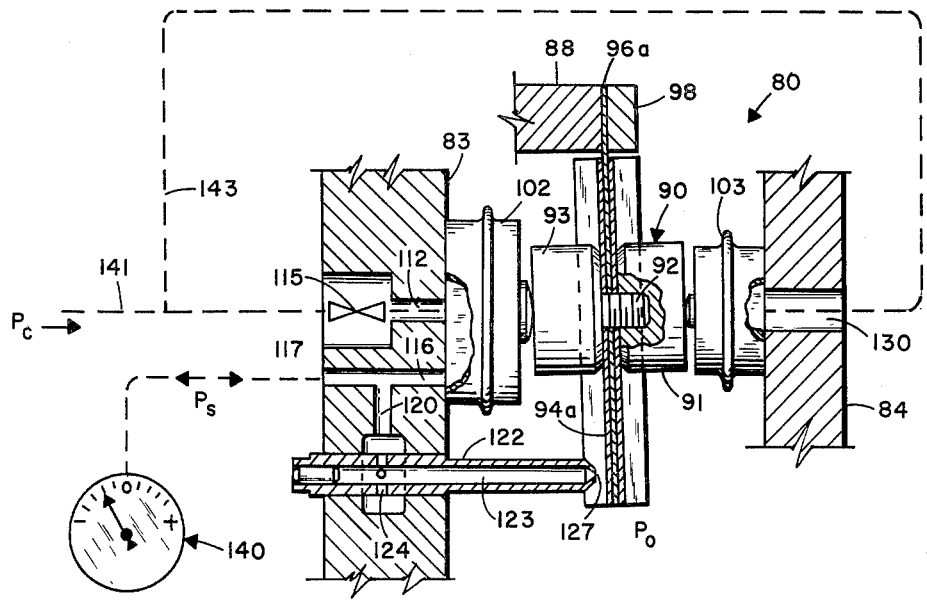
FIG. 6 is a schematic illustration of an acceleration indicating system including the accelerometer device of FIGS. 3-5.

Referring now to FIG. 6, the accelerometer device 80 is shown schematically in an acceleration indicating system including a fluid pressure supply and an indicating means 140 similar to indicators 34 and 72 previously described. Thus, a pressure supply line 141 is adapted to be connected to a pressure fluid supply which provides pressure fluid at a constant supply pressure $P_c$. The supply pressure $P_c$ is maintained constant with respect to the ambient pressure $P_o$ about the device 80, in a manner similar to that of the embodiment of FIG. 1.

Figure 3:
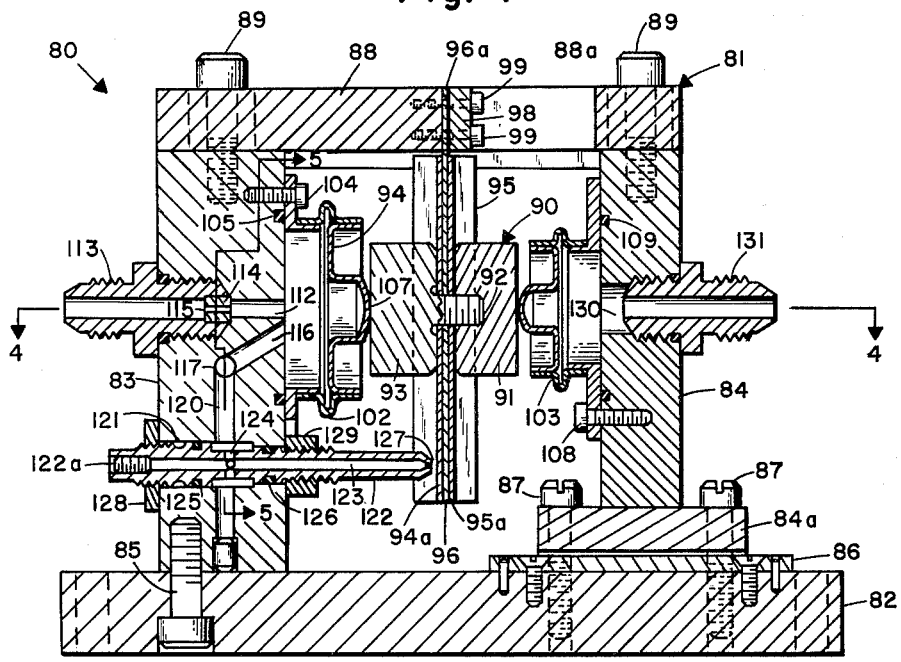
FIG. 3 is a vertical longitudinal section of yet another embodiment of the invention.

Line 141 is connected as by connector 113 of FIG 3, the fixed orifice 115, and passage 112, to the interior of the larger bellows 102. A branch pressure supply line 143 leads from line 141 to passage 130 of upright 84, and the interior of the smaller bellows 103. The pressure within the bellows 103 is therefore always the same as the supply pressure $P_c$.

It will be recognized that a flow of pressure fluid may be traced from supply line 141 at pressure $P_c$ through fixed orifice 115, passage 112, bellows 102, passages 116, 120, 124, 123, and out orifice 127 at pressure $P_o$. The flow from orifice 127, hereinafter referred to as variable orifice 127, is controlled by movement of the mass 90 and web portion 94a of channel member 94 which acts in the nature of a valve. The just described flow path will be seen to consist of a fixed orifice 115 and a variable orifice 127 connected in series with the bellows 102 therebetween.

Assuming the pressure differential between $P_c$ and $P_o$ to remain a constant K, there will be developed between the orifices and within the bellows 102 a resultant or signal pressure $P_s$ which will vary inversely with respect to changes in the variable orifice 127. That is to say, if the web 94a moves away from tubular member 122 (this condition being shown in an exaggerated state in FIG. 6) so as to increase the effective area of orifice 127, there will be experienced a corresponding reduction in the pressure $P_s$ in the bellows 102. Conversely, when web 94a is moved toward the variable orifice 127 so as to reduce the effective area thereof, there will be experienced in the bellows 102 a corresponding increase in the pressure $P_s$.

The scale of indicator 90 is calibrated in terms of positive and negative acceleration on opposite sides of the half scale deflection corresponding to zero acceleration. The direction and magnitude of acceleration of the device 80 to the left or right as viewed in the drawings may then be read directly from the indicator. Thus, if the device 80 is accelerated to the right, the combined effects of the force of acceleration $F_a$ and the constant force of bellows 102 will displace the mass 90 to the left thereby decreasing the effective area $A_v$ of the variable orifice 127 and increasing $P_s$ and $F_v$ until the latter balances $F_c+F_a$. The increase in $P_s$ will cause the indicator 90 to register positive acceleration, that is acceleration to the right, by deflecting the needle of the indicator to a corresponding reading to the right of the mentioned center or zero reading. Conversely acceleration of the device to the left (or a decrease in velocity to the right) will produce negative deflection of the needle of indicator 90 to a corresponding reading to the left of the zero reading.

Inasmuch as the accelerometer devices 10, 15 and 80 utilize live, flowing pressure fluid, and since the pressure $P_s$ is independent of the volume of fluid between the orifices, the fluid which goes to operation of the indicators 34, 72 and 140 does not affect the accuracy of the devices. Also, the signal pressure $P_s$ may be used to do increments of work other than indicating. For example, the signal pressure may be utilized to govern pressure actuated fuel control valves in aircraft or the like, with the pressure $P_s$ being restored upon the completion of each increment of work so that accuracy of the accelerometer is substantially unaffected by the doing of work within the pressure range of the device.

From the foregoing detailed description of preferred embodiments of the invention, it will be appreciated that there has been provided thereby improved fluid pressure operated accelerometer devices which are capable not only of indicating magnitude of acceleration but which are also bidirectional in indication of acceleration. Moreover, accelerometers embodying this invention are simple of construction and reliable in operation, and maintain constant sensitivity throughout their range of operation.

Although the invention has been described in considerable detail with reference to specific accelerometer devices embodying the invention, it will be understood that the invention is not limited thereto, but rather the invention includes all those modifications, adaptations, substitutions, and uses as are reasonably embraced by the scope of the claims hereof.

Having described our invention, we claim:

1. An accelerometer device for producing fluid pressure signals related to the magnitude and direction of acceleration of the device, said device comprising:
   (a) support means,
   (b) an inertial member mounted for displacement in opposite directions with respect to said support means by inertial forces resulting from acceleration of said device,
   (c) pressure fluid conducting means for connection to a source of pressure fluid at an initial pressure and including first and second orifices connected in series so that fluid flow through said orifices will establish therebetween a resulting signal pressure related to the ratio of areas of said orifices,
   (d) a constant force producing means acting against said member in one direction,
   (e) a pressure to force means responsive to said resulting signal pressure and acting against said member in the opposite direction; and
   (f) the effective area of one of said orifices being variable by displacement of said member whereby displacement of said member in said one direction will increase said resulting signal pressure until said pressure to force means balances the displacing forces, and displacement of said member in the opposite direction will decrease said resulting signal pressure until said pressure to force means balances the displacing forces.

2. An accelerometer device as defined in claim 1 and wherein said constant force producing means comprises a second pressure to force means responsive to said initial pressure and acting between said support means and said inertial member.

3. An accelerometer device as defined in claim 1 and wherein said constant force producing means comprises spring means acting between said support means and said inertial member.

4. An accelerometer device as defined in claim 2 and wherein said first and second pressure to force means comprise first and second expansible bellows elements, said first bellows element having an effective area which is twice that of said second bellows element.

5. An accelerometer device for producing fluid pressure signals related to the magnitude and direction of acceleration of the device, said device comprising:
   (a) support means,
   (b) an inertial member mounted for displacement in opposite directions with respect to said support means by inertial forces resulting from acceleration of said device,
   (c) pressure fluid conducting means for connection to a source of pressure fluid at a regulated pressure and including first and second orifices connected in series so that fluid flow through said orifices will establish therebetween a resulting signal pressure related to the ratio of areas of said orifices,
   (d) a first pressure to force means responsive to said regulated pressure and acting against said member in one direction,
   (e) a second pressure to force means responsive to said resulting signal pressure and acting against said member in the opposite direction, and
   (f) the effective area of one of said orifices being variable by displacement of said member whereby displacement of said member in said one direction will increase said resulting signal pressure until said second pressure to force means balances the displacing forces, and displacement of said member in the opposite direction will decrease said resulting signal pressure until said first pressure to force means balances the displacing forces.

6. An accelerometer device for producing fluid pressure signals related to the magnitude and direction of acceleration of the device, said device comprising:
   (a) support means,
   (b) an inertial member mounted for displacement in one direction or the opposite direction with respect to said support means by inertial forces resulting from acceleration of said device in said opposite direction or said one direction respectively.
   (c) pressure fluid conducting means for connection to a source of pressure fluid at a regulated pressure and including first and second orifices connected in series so that fluid flow through said orifices will establish therebetween a resulting signal pressure related to the ratio of the areas of said orifices,
   (d) a first pressure to force means responsive to said regulated pressure and acting against said member in said one direction,
   (e) a second pressure to force means responsive to said resulting signal pressure and acting against said member in said opposite direction to provide a net force thereon,
   (f) said second pressure to force means having a pressure to force conversion factor which is greater than that of said first pressure to force means, whereby a net force of zero may be produced by a signal pressure which is less than said regulated pressure; and
   (g) means connected to said member for varying the effective area of one of said orifices upon displacement of said member whereby displacement of said member in said one direction will increase said resulting signal pressure until said net force balances the displacing force, and displacement of said member in the opposite direction will decrease said resulting signal pressure until said net force balances the displacing force.

7. An accelerometer device as defined in claim 6 and wherein said first and second pressure to force means comprise first and second expansible members, respectively, comprising movable wall means of predetermined effective areas acted upon by said regulated and signal pressures.

8. An accelerometer device as defined in claim 7 and wherein the effective area of said second expansible member is twice the effective area of said first expansible member, whereby at zero acceleration, said net force is zero when said signal pressure is one-half of said regulated pressure.

9. An accelerometer device for producing fluid pressure signals corresponding to the magnitude and direction of acceleration of the device, said device comprising:
  (a) support means having an inlet passage for connection to a regulated source of pressure fluid, and an outlet passage communicating with an exterior reference pressure,
  (b) first and second bellows mounted on said support means and acting against opposite sides of a movable inertial member,
  (c) said first bellows having an effective area smaller than that of said second bellows, and communicating with said inlet passage,
  (d) said inertial member having defined therein a fixed orifice communicating between said first and second bellows,
  (e) a tubular member extending from said support means into said second bellows and defining a second orifice communicating between the second bellows and said outlet passage, said second orifice being increasingly and decreasingly restricted by movement of said inertial member toward and away from said tubular member in response to accelerating forces, whereby a resulting signal pressure in said second bellows increases and decreases in response to changes in accelerating forces acting on said inertial member with signal pressures above a predetermined value corresponding to acceleration in one direction, and signal pressures below said predetermined value corresponding to acceleration in the opposite direction.

10. An accelerometer device for producing fluid pressures corresponding to the magnitude and direction of acceleration of the device, said device comprising:
  (a) support means having an inlet passage for connection to a source of pressure fluid and comprising a fixed orifice,
  (b) a bellows mounted on said support means in communication with said inlet passage through said fixed orifice and acting against one side of a movable inertial member,
  (c) said inertial member having an outlet passage communicating between the interior of said bellows and a reference pressure zone exterior of said bellows,
  (d) a stationary valve member mounted on said support means and extending into said bellows, said valve member being disposed in restrictive relation to said outlet passage; and
  (e) spring means acting between said support means and said inertial member and urging the latter in toward said valve member,
  (f) movement of said inertial member toward and away from said valve member being effective to increase and decrease the restriction of said outlet passage by said valve member and to increase and decrease a resulting signal pressure in said bellows until the force of said bellows acting on said one side of said inertial member balances forces acting on said other side thereof,
  (g) whereby a first resulting signal pressure is established at zero acceleration to balance the force of said spring on said inertial member, said signal pressure increasing and decreasing from said first signal pressure in accordance with acceleration forces acting on said inertial member in one direction or the other.

11. An accelerometer device as defined in claim 10 and wherein said spring means comprises means for adjustably increasing and decreasing the force of said spring means on said inertial member.

12. An accelerometer device as defined in claim 10 and wherein said stationary valve member is adjustable toward and away from said inertial member.

13. An accelerometer device for producing fluid pressure signals related to the magnitude and direction of acceleration of the device, said device comprising:
  (a) support means,
  (b) an inertial pendulum member mounted for displacement in opposite directions with respect to said support means by inertial forces resulting for acceleration of said device,
  (c) pressure fluid conducting means for connection to a source of pressure fluid at a regulated pressure and including first and second orifices connected in series so that fluid flow through said orifices will establish therebetween a resulting signal pressure related to the ratio of areas of said orifices,
  (d) a first bellows means responsive to said regulated pressure and acting to produce a constant force against said member in one direction,
  (e) a second bellows means having an effective area which is a multiple of the effective area of said first bellows means, said second bellows means being responsive to said signal pressure and acting to produce a variable force against said member in the opposite direction to produce a net force on said member,
  (f) valve means connected to said member and operative to decrease said second orifice upon displacement of said member in said one direction by positive accelerating forces to increase said signal pressure until said net force balances the positive accelerating forces, said valve means being operative upon displacement of said member in the opposite direction by negative accelerating forces to increase said second orifice and decrease said signal pressure until said net force balances said negative accelerating forces; and
  (g) signal pressure responsive indicating means connected in communication with the interior of said second bellows means.

14. An accelerometer device as defined in claim 13 and wherein said second bellows has an effective area twice that of said first bellows, whereby said net force is zero when said signal pressure is one-half of said regulated pressure.

15. An accelerometer device as defined in claim 14 and wherein said indicating means has a zero acceleration ready at half scale, whereby magnitude and direction of acceleration may be read simultaneously therefrom.

16. A bidirectional accelerometer device for producing fluid pressure signals corresponding to the magnitude and direction of acceleration of the device, said device comprising:
  (a) a support frame including a base and first and second frame members mounted on said base in spaced relation to one another,
  (b) inertial means having a predetermined mass and supported for movement in opposite directions in a plane extending through said first and second frame members,
  (c) a first pressure responsive expansible power element mounted on said first member and having a movable portion acting in one direction against said inertial means, said first power element having a first predetermined pressure to force converting factor,
  (d) a second pressure responsive power element mounted on said second frame member and having a movable portion acting against said inertial means in the opposite direction to said one direction, said second power element having a second pressure to force conversion factor which is a multiple of said first conversion factor,
  (e) said frame defining pressure fluid conducting passageways including an inlet for connection to a source of pressure fluid having a constant pressure with respect to a reference pressure and communicating with the interior of said first power element, said passageways including a fixed orifice communicating between said inlet and said second power element, and a passage means communicating between said second power element and a second orifice opening to said reference pressure; and (f) said inertial means including means cooperating with said second orifice to decrease and increase the effective area thereof with movement of said inertial means in said one direction and in said opposite direction respectively, whereby fluid pressure within said second power element is varied in accordance with movement of said inertial means and acceleration forces acting to move said inertial means are balanced by the net forces produced by said first and second power elements, whereby the fluid pressure in said second power element is indicative of the direction and magnitude of said acceleration forces.

17. An accelerometer device as defined in claim 16 and wherein said inertial means comprises elongated rigid means connected at one end to said frame by torsion resisting pivot means, and a weight mounted on said rigid means and confined between said first and second power elements.

18. An accelerometer device as defined in claim 17 and wherein said second orifice is defined in one end of a tubular member extending from said frame and terminating adjacent said rigid means whereby flow of pressure fluid from said second orifice is adapted to be variably restricted by said rigid means.

References Cited by the Examiner

UNITED STATES PATENTS

| | | | |
|---|---|---|---|
| 2,405,382 | 8/1946 | Volet | 73—515 |
| 3,014,373 | 12/1961 | Lindbom | 73—515 |
| 3,042,343 | 7/1962 | Cooke | 73—515 |

FOREIGN PATENTS 768,033    5/1955    Germany.

RICHARD C. QUEISSER, *Primary Examiner.*

JAMES J. GILL, *Examiner.*